(12) United States Patent
Carlson

(10) Patent No.: US 11,267,766 B2
(45) Date of Patent: Mar. 8, 2022

(54) LIQUID FERTILIZER APPLICATORS AND METHODS OF FORMING LIQUID FERTILIZER CONCENTRATE

(71) Applicant: Donald Edward Carlson, Joliet, IL (US)

(72) Inventor: Donald Edward Carlson, Joliet, IL (US)

( * ) Notice: Subject to any disclaimer, the term of this patent is extended or adjusted under 35 U.S.C. 154(b) by 182 days.

(21) Appl. No.: 16/582,038

(22) Filed: Sep. 25, 2019

(65) Prior Publication Data
US 2021/0087118 A1    Mar. 25, 2021

(51) Int. Cl.
| | |
|---|---|
| *C05B 17/00* | (2006.01) |
| *A01C 15/12* | (2006.01) |
| *C05C 3/00* | (2006.01) |
| *C05C 9/00* | (2006.01) |
| *C05D 9/02* | (2006.01) |
| *C05D 1/00* | (2006.01) |

(52) U.S. Cl.
CPC .............. *C05B 17/00* (2013.01); *A01C 15/12* (2013.01); *C05C 3/00* (2013.01); *C05C 9/00* (2013.01); *C05D 1/00* (2013.01); *C05D 9/02* (2013.01)

(58) Field of Classification Search
None
See application file for complete search history.

(56) References Cited

U.S. PATENT DOCUMENTS

| | | | | |
|---|---|---|---|---|
| 2,761,734 A | * | 9/1956 | Farmer ................ | B01F 5/0496 239/318 |
| 4,439,223 A | | 3/1984 | Boles et al. | |
| 5,150,840 A | * | 9/1992 | Grynkiewicz ....... | A01C 23/042 239/305 |
| 5,303,729 A | * | 4/1994 | DeMarco ............. | A01C 23/042 137/268 |
| 5,335,690 A | * | 8/1994 | Worth .................. | A01C 23/042 137/268 |
| 5,361,849 A | * | 11/1994 | Moore ..................... | A01C 5/02 111/127 |
| 5,365,970 A | * | 11/1994 | Butler .................. | A01C 23/042 137/192 |
| 6,173,732 B1 | * | 1/2001 | Davis ................... | A01C 23/042 137/268 |

(Continued)

OTHER PUBLICATIONS

Ebay search—Karcher K3 Follow-Me Electric Power Pressure Washer with 4 Wheels, 1800 PSI, www.ebay.com, retrieved Sep. 24, 2019.

(Continued)

*Primary Examiner* — Wayne A Langel
(74) *Attorney, Agent, or Firm* — Foley & Lardner LLP

(57) ABSTRACT

A fertilizer application system for a liquid fertilizer concentrate includes a container containing a first fluid. A siphon is disposed on the container and includes two inlets and an outlet. A flow control valve is configured to selectively control an amount of first fluid flowing through the siphon based on ambient temperature of an environment outside the container. A siphon tube includes a siphon tube first portion in fluid communication with the first fluid, and a siphon tube second portion fluidly coupled to an inlet of the siphon. The first fluid includes a liquid fertilizer concentrate comprising a nitrogen containing source, a phosphorous containing source, a sulfur containing source, a potassium containing source, an iron containing source, and water.

12 Claims, 11 Drawing Sheets

(56) References Cited

U.S. PATENT DOCUMENTS

| | | | | |
|---|---|---|---|---|
| 7,604,183 B1* | 10/2009 | Hensley | ............... | A01C 23/047 |
| | | | | 180/53.4 |
| 2005/0005974 A1* | 1/2005 | Roberts | ............... | A01C 23/042 |
| | | | | 137/564.5 |
| 2006/0265106 A1* | 11/2006 | Giles | .................... | A01C 23/007 |
| | | | | 700/283 |
| 2011/0315790 A1* | 12/2011 | Orubor | ................ | B05B 7/0408 |
| | | | | 239/310 |
| 2012/0097763 A1* | 4/2012 | Orubor | .................... | B05B 7/30 |
| | | | | 239/303 |
| 2017/0020062 A1* | 1/2017 | Lovato | ................. | B01F 5/0413 |
| 2019/0200515 A1* | 7/2019 | Lichtman | ............... | A01C 15/02 |

OTHER PUBLICATIONS https://www.usplastic.com/catalog/item.aspx?sku=65370&utm_source=criteo&utm_medium, 5 Gallon Rechargeable Sprayer w/PE Tank, 1 GPM Pump & 12 Volt Rechargeable Battery, retrieved on May 24, 2019.

walmart.com, 25951 6 Gallon Portable RV Wastewater Tank, retrieved on Sep. 24, 2019.

walmart.com, Barker 11104 Tote-Along 2 Wheel RV Waste Tank—22 Gallon, https://www.walmart.com/ip/Barker-11104-Tote-Along-2-Wheel-RV-Waste-Tank-22-Gallon, retrieved on May 31, 2019.

\* cited by examiner

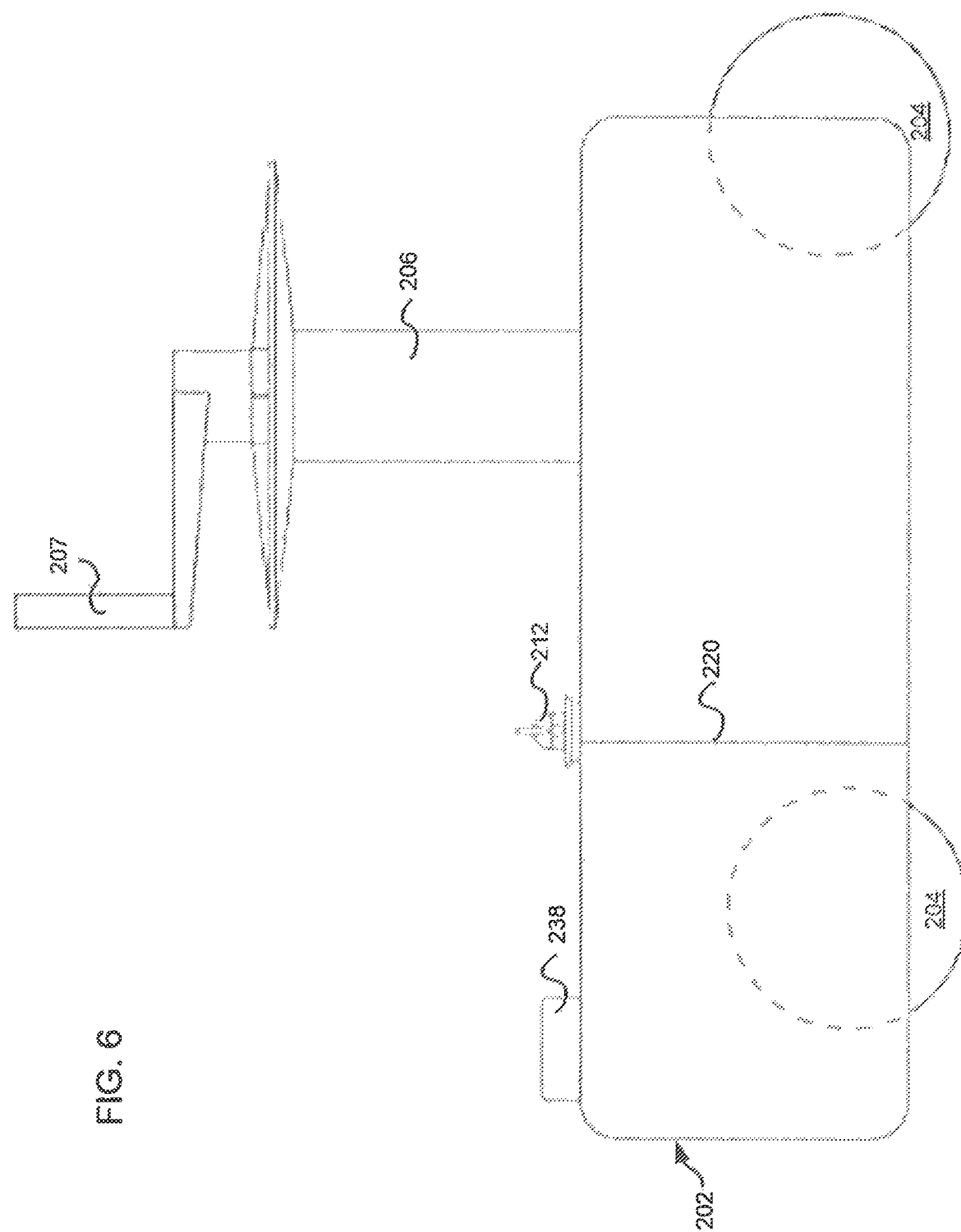

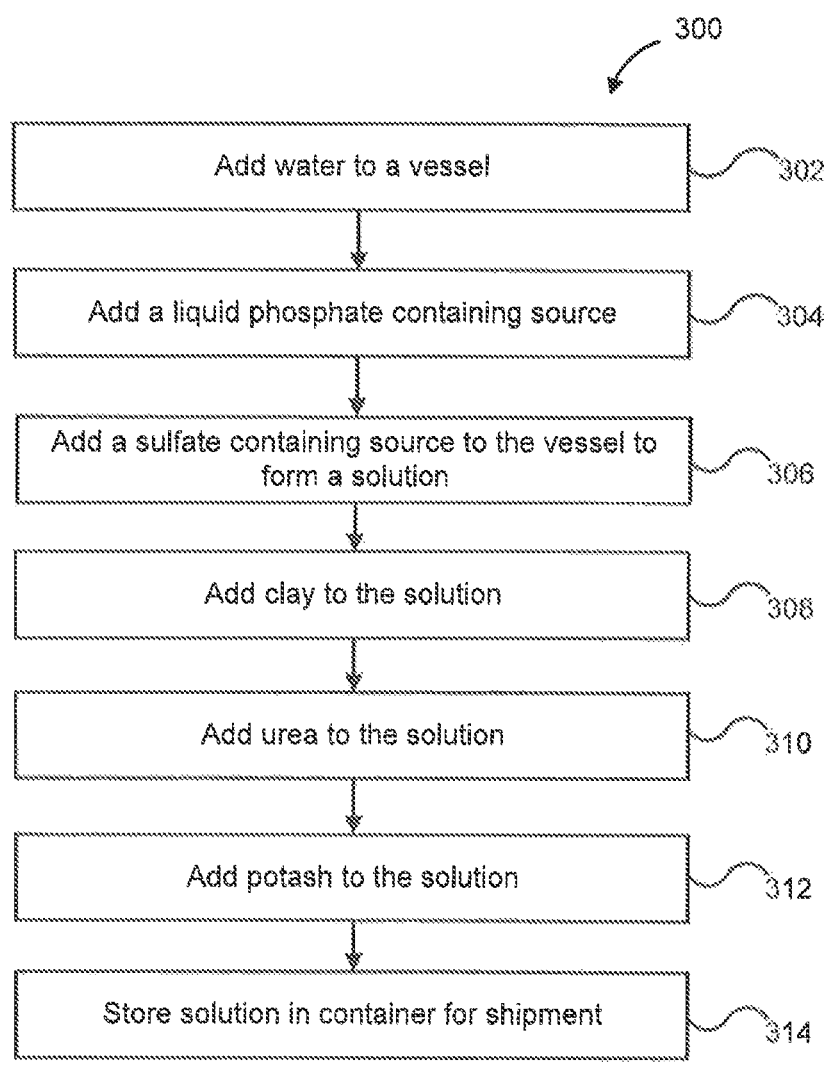

LIQUID FERTILIZER APPLICATORS AND METHODS OF FORMING LIQUID FERTILIZER CONCENTRATE

TECHNICAL FIELD

The present disclosure relates generally to systems and methods for the application and production of liquid fertilizer concentrates.

BACKGROUND

Directly applied liquid fertilizer cannot be applied in hot weather without burning a homeowner's yard or lawn. Dry fertilizers will not start working until it rains and sinks into the grass.

SUMMARY

Embodiments described herein relate generally to the systems and methods for the production and application of a liquid fertilizer concentrate, and particularly liquid fertilizer concentrate applicators, liquid fertilizer concentrate compositions, and methods for producing liquid fertilizer concentrates.

In some embodiments, a fertilizer application system comprises a container defining an internal volume configured to hold a first fluid. The siphon has a first inlet structured to receive a first fluid, a second inlet structured to receive a second fluid, and an outlet configured to output a mixed fluid comprising a mixture of the first fluid and the second fluid. The fertilizer application system also comprises a siphon tube including a siphon tube first portion in fluid communication with the first fluid and a siphon tube second portion fluidly coupled to the first inlet of the siphon. A flow control valve is disposed on the container. The flow control valve is fluidly coupled to a downstream end of the siphon tube first portion and an upstream end of the siphon tube second portion. The flow control valve is configured to selectively control an amount of the first fluid flowing through the flow control valve to the siphon through the siphon tube second portion based on an ambient temperature of an environment outside the container.

In some embodiments, a liquid fertilizer concentrate comprises a nitrogen containing source, a phosphorous containing source, a sulfur containing source, a potassium contain source, an iron containing source, and water. A concentration of nitrogen in the liquid fertilizer concentrate is in a range of about 18 wt % to about 42 wt %, inclusive.

In some embodiments, a method for formulating a liquid fertilizer concentrate comprises inserting a phosphorous containing source into a vessel, adding a sulfur containing source to the vessel, adding an iron containing source vessel, adding a nitrogen containing source to the vessel, adding a potassium containing source to the vessel, and adding water to the vessel to form a mixture. The mixture is mixed to form the liquid fertilizer concentrate. A concentration of nitrogen in the liquid fertilizer concentrate is in a range of about 18 wt % to about 42 wt %, inclusive.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 6 is a side view of the fertilizer application system of FIG. 5.

FIG. 7 is a schematic flow diagram of the method for producing the liquid fertilizer concentrate, according to an embodiment.

Figure 1:
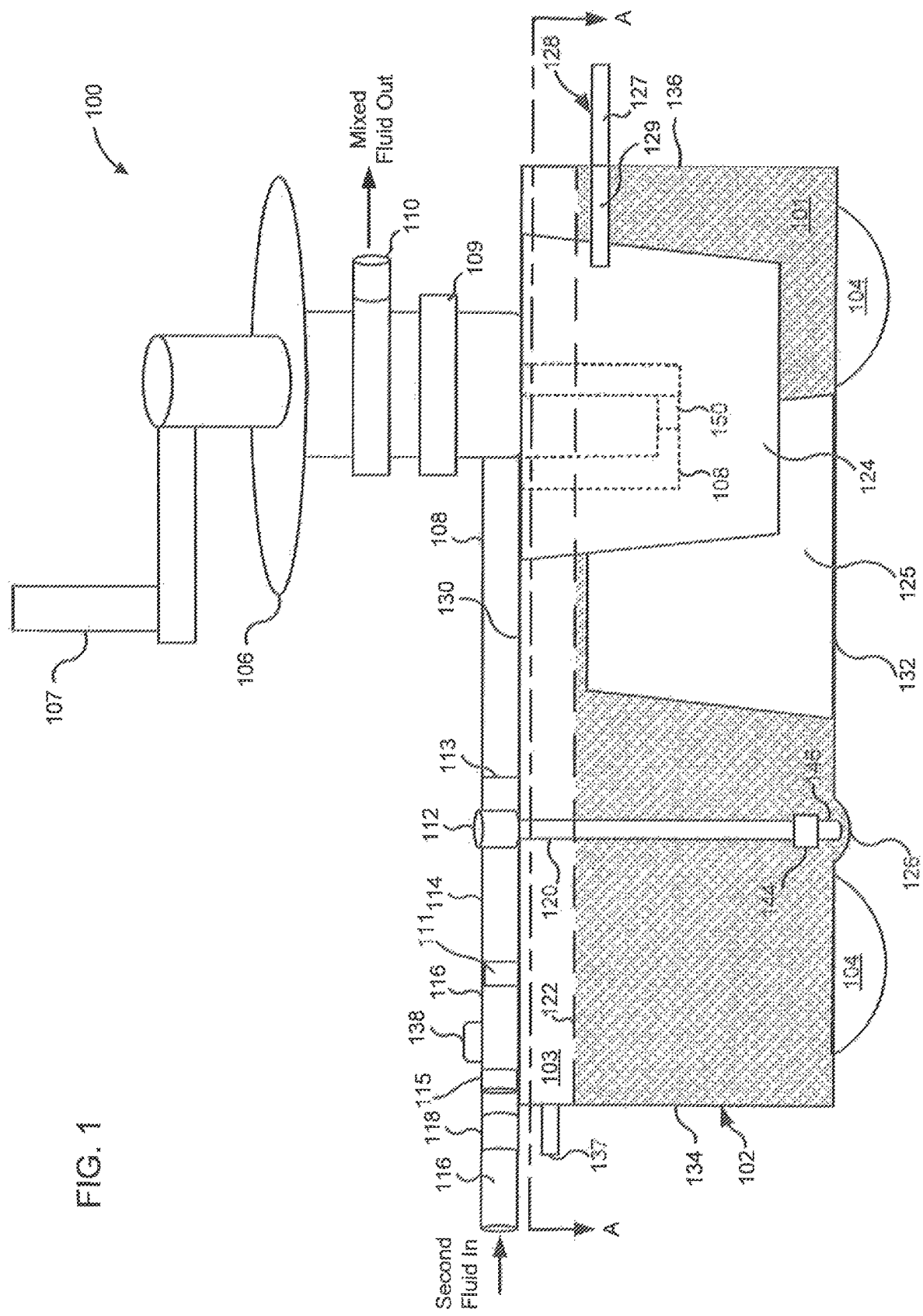
FIG. 1 is a schematic illustration of the fertilizer application system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to the systems and methods for the production and application of liquid fertilizer concentrate, and particularly liquid fertilizer concentrate applicators, liquid fertilizer concentrate compositions, and methods for producing liquid fertilizer concentrates.

Embodiments described herein may provide several advantages over conventional lawn fertilizer systems including, for example: (1) allowing application in hot weather without burning the lawn; (2) allowing efficient absorption of fertilizer in the soil without rain; (3) providing cost savings over conventional dry fertilizers; (4) allowing even distribution of fertilizer over a target area; (5) providing convenience and ease of use to untrained individuals; and (6) having lower shipping costs.

FIGS. 1-4 show a fertilizer application system 100, according to an embodiment. FIG. 1 is a schematic illustration of the fertilizer application system 100. The fertilizer application system 100 includes a container 102 defining an internal volume configured to house a first fluid 101, for example, a liquid fertilizer concentrate. In some embodiments, the container 102 may have a volume of about half gallon to about 25 gallons. A headspace 103 is defined between an upper wall or roof 130 of the container and the first fluid 101. The container 102 may have any suitable shape such as an extended trapezoidal prism, a rectangular prism, a cube, a triangular prism, round, circular, spherical, etc., or any combination thereof. The container 102 may be made of any suitable material such as, for example, plastic, metals, alloys, polymers, ceramics, composite materials, and/or any combinations thereof.

Figure 4:
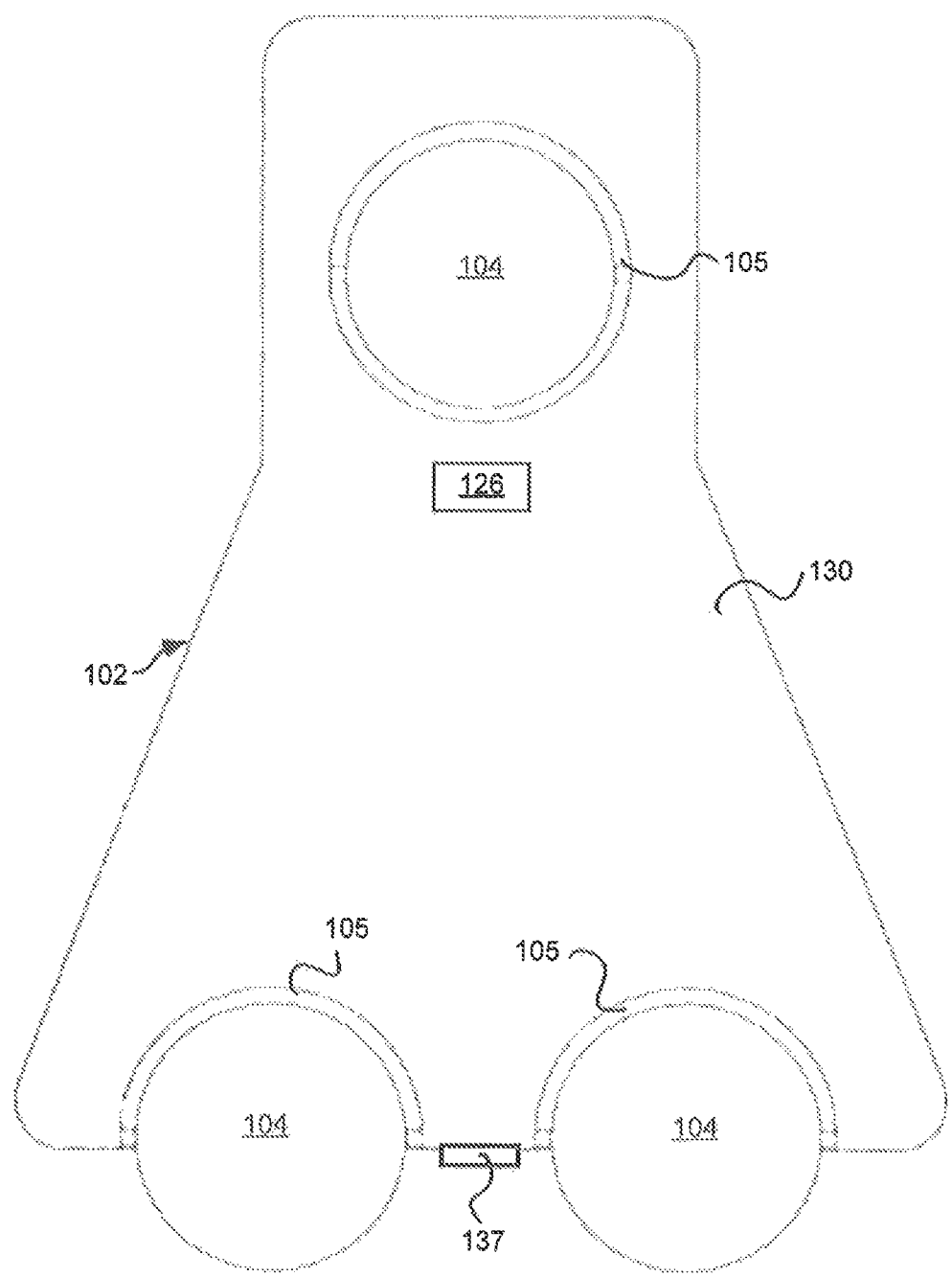
FIG. 4 is a bottom side view of the fertilizer application system of FIG. 1.

In some embodiments, the container 102 includes a locomotion device, for example, rolling mechanism 104 coupled thereto and configured to allow the container 102 to be rolled or wheeled on ground. Any locomotion device may be used such as, for example, sliding surfaces such as skids, or rolling mechanisms such as tracks, wheels, balls, tubes, castor wheels, bottle caps, etc. as shown in FIG. 4. In particular embodiments, the rolling mechanism 104 comprises ball wheels. In some embodiments, the rolling mechanism 104 is positioned within a rolling mechanism cavity 105 such as but not limited to a wheel well. In other embodiments, the rolling mechanism 104 may be coupled to a bottom wall of floor 132 of the container 102.

In some embodiments the container 102 may include a hose reel 106 disposed on the container 102. The hose reel 106 may include a hose reel handle 107 and an output hose 109 configured to expel a fluid. The output hose 109 may include, but is not limited to, a stainless steel covered hose or a garden hose. The hose reel 106 may also be coupled to a first hose 108. The first hose 108 is configured to provide a fluid to the hose reel 106. A fluid dispensing device 110, may be connected to the output hose 109. The fluid dispensing device 110 may be configured to expel the fluid provided by the output hose 109 thereto. Such fluid dispensing devices 110 may include but are not limited to sprays, jets, shower heads, nozzles, etc.

Figure 3:
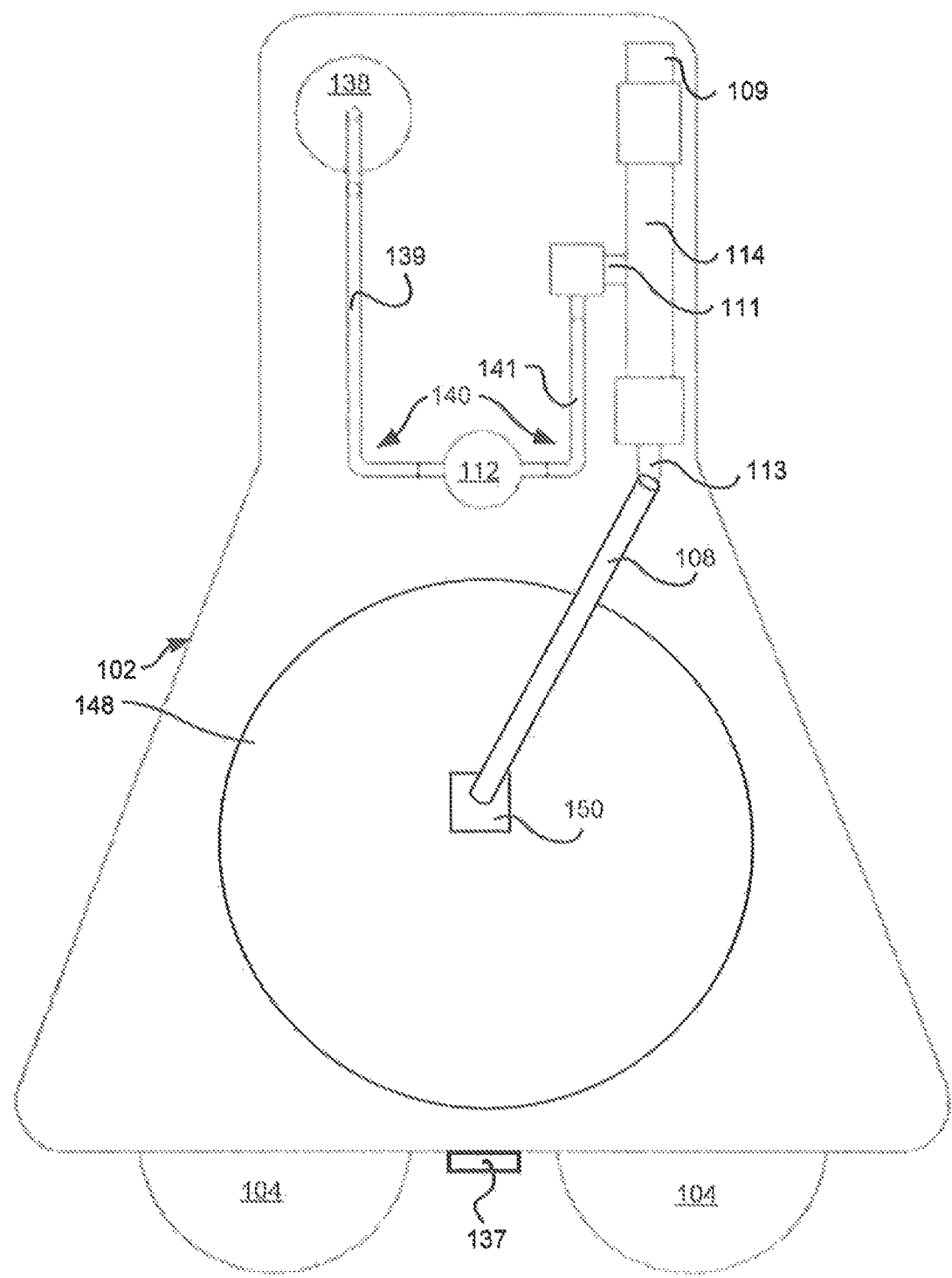
FIG. 3 is a top side view of the fertilizer application system of FIG. 1.

In some embodiments, the hose reel 106 may be hollow. In some embodiments, the hose reel 106 may include a rotating column, for example, a cylindrical, rectangular, polygonal, elliptical, oval, or any other suitable shape column. In some embodiments, the hose reel 106 may be disposed on the container 102 by placement on a hose reel plate 148 (FIG. 3). The hose reel plate 148 may be configured to be the same size as the hose reel 106 and to secure the hose reel 106. The hose reel 106 could be secured by any fastening mechanism such as, but not limited to, clips, snaps, Velcro, etc., to the hose reel plate 148. In some embodiments, the hose reel 106 is configured to be detachable from the hose reel plate 148. In some embodiments, the hose reel plate 148 is an indentation of the size of the hose reel 106 disposed on a wall of the container 102. The hose reel plate 148 may rotatably disposed in an aperture defined in the upper wall 130 of the container 102 so as to allow the hose reel 106 to be rotated relative to the container 102.

A siphon 114 is disposed on the container 102. The siphon 114 includes a first inlet 111 structured to receive the first fluid 101, a second inlet 109 structured to receive a second fluid, and an outlet 113 configured to output a mixed fluid comprising a mixture of the first fluid 101 and the second fluid. A siphon tube 140 is fluidly coupled to the siphon 114. In some embodiments, the siphon tube 140 includes a siphon tube first portion 139 in fluid communication with the first fluid 101, and a siphon tube second portion 141 (FIG. 3) fluidly coupled to the first inlet 111 of the siphon 114. In some embodiments, the second fluid is water. The siphon 114 is connected to a flow control valve 112 disposed on the container 102. For example, the flow control valve 112 may be fluidly coupled to a downstream end of the siphon tube first portion 139 and an upstream end of the siphon tube second portion 141. The flow control valve 112 is configured to selectively control an amount of the first fluid 101 flowing through the flow control valve 112 to the siphon 114 through the siphon tube second portion 141 based on an ambient temperature of an environment outside the container 102.

The siphon 114 may also include a filter 115 configured to filter particles present in the first fluid 101. The siphon 114 may be coupled to a second hose 116 configured to provide the second fluid to the siphon 114 to produce a mixed fluid including a mixture (e.g., a diluted liquid fertilizer) of the first fluid 101 (e.g., a liquid fertilizer) and the second fluid (e.g., water). The filter 115 prevents larger particles in the first fluid 101 from flowing out with the mixed fluid. In some embodiments, the mixed fluid is a mixture of the first fluid 101 and the second fluid. In some embodiments, the mixed fluid is then provided to the first hose 108.

The second hose 116 includes a connecting device 118 configured to couple the second hose 116 to a second fluid source. The second hose 116 may be configured to receive the second fluid through the connecting device 118. The flow control valve 112 may be fluidly coupled to a siphon tube 140 (FIG. 3).

An inlet tube 120 may be fluidly coupled to the siphon tube 140 through a cap 138 and fluidly couples the siphon tube 140 to the first fluid 101 so that the siphon tube 140 provides a passage for fluid to flow through when negative pressure is created within the siphon 114. In some embodiments, a check valve 144 may be coupled to an end of the inlet tube 120 through which the first fluid 101 enters the inlet tube 120. The check valve 144 is configured to provide unidirectional flow to allow the first fluid 101 to flow in the inlet tube 120 towards the siphon 114 without allowing the second fluid to flow into the container 102. In some embodiments, an inlet tube filter 146 may be coupled to the check valve 144 or the inlet tube 120. The inlet tube filter 146 is configured to filter particles present in the first fluid 101. The inlet tube filter 146 may be made from any material for example, but not limited to, metal, plastic, or ceramic. In some embodiments, the inlet tube filter 146 is configured to filter large particles.

In some embodiments, the flow control valve 112 comprises different possible temperature options such as about 50 degrees, about 60 degrees Celsius, about 70 degrees Celsius, about 80 degrees Celsius, about 90 degrees Celsius, and about 100 degrees Celsius and all temperatures within these values. The flow control valve 112 is configured to draw varying amounts of first fluid 101 into the siphon 114 so as to control a ratio of the first fluid 101 to the second fluid depending on the temperature option selected by a user. The user-selected temperature may be the temperature of the ambient environment outside the container. In this manner, the fertilizer application system 100 allows control of different diluted ratios of liquid fertilizer concentrate to prevent lawn burn off, particularly when the ambient temperature is significantly high (e.g., greater than 80 about degrees Celsius).

In some embodiments, a fluid level line 122 may be defined on a wall of the container 102. The fluid level line 122 is configured to indicate a maximum allowable level of the first fluid 101 in the container 102 such that the headspace 103 that is filled with air is present. The headspace 103 allows for sloshing and violent mixing of the first fluid 101 contained within the container 102 to facilitate mixing and dissolution of fertilizer particles that may have sublimated in the first fluid 101 (e.g., a liquid fertilizer concentrate).

In some embodiments, the container 102 further includes at least one top baffle 124. The at least one top baffle 124 may be coupled to the upper wall 130 of the container 102. In some embodiments, the container 102 may also include at least one bottom baffle 125 coupled to the bottom wall 132 of the container 102. In some embodiments, at least one top baffle 124 or at least one bottom baffle 125 may be hollow. The top baffle or the bottom baffle may be made out of any material such as metal, plastic, ceramic, etc. The at least one top baffle 124 and the at least one bottom baffle 125 are configured to create turbulence in the first fluid 101 disposed in the container 102 when the first fluid 101 is being mixed so as to generate turbulence as the first fluid 101 sloshes in the container 102. In some embodiments, an edge of the at least one top baffle 124 that is proximate to the floor 132 of the container 102 is at a distance of about 0.5 inches to 2 inches from the floor 132. In some embodiments, the rolling mechanism cavity 105 is configured to further generate turbulence as the first fluid 101 sloshes in the container 102.

In some embodiments, the hose reel 106 is configured to have a connector 150 (FIG. 3) that extends into the hollow top baffle 124. The hose reel 106 may include a hollow cylinder providing a flow path for the mixed fluid to flow to the outlet tube 109. The connector 150 is fluidly coupled to the flow path and configured to be coupled to an end of the first hose 108 that also extends into the hollow top baffle 124, for example, via a friction fit or snap-fit mechanism. The hose reel 106 is further configured to have an outlet connected to the outlet hose 109 that is configured to expel the mixed fluid.

Figure 2A:
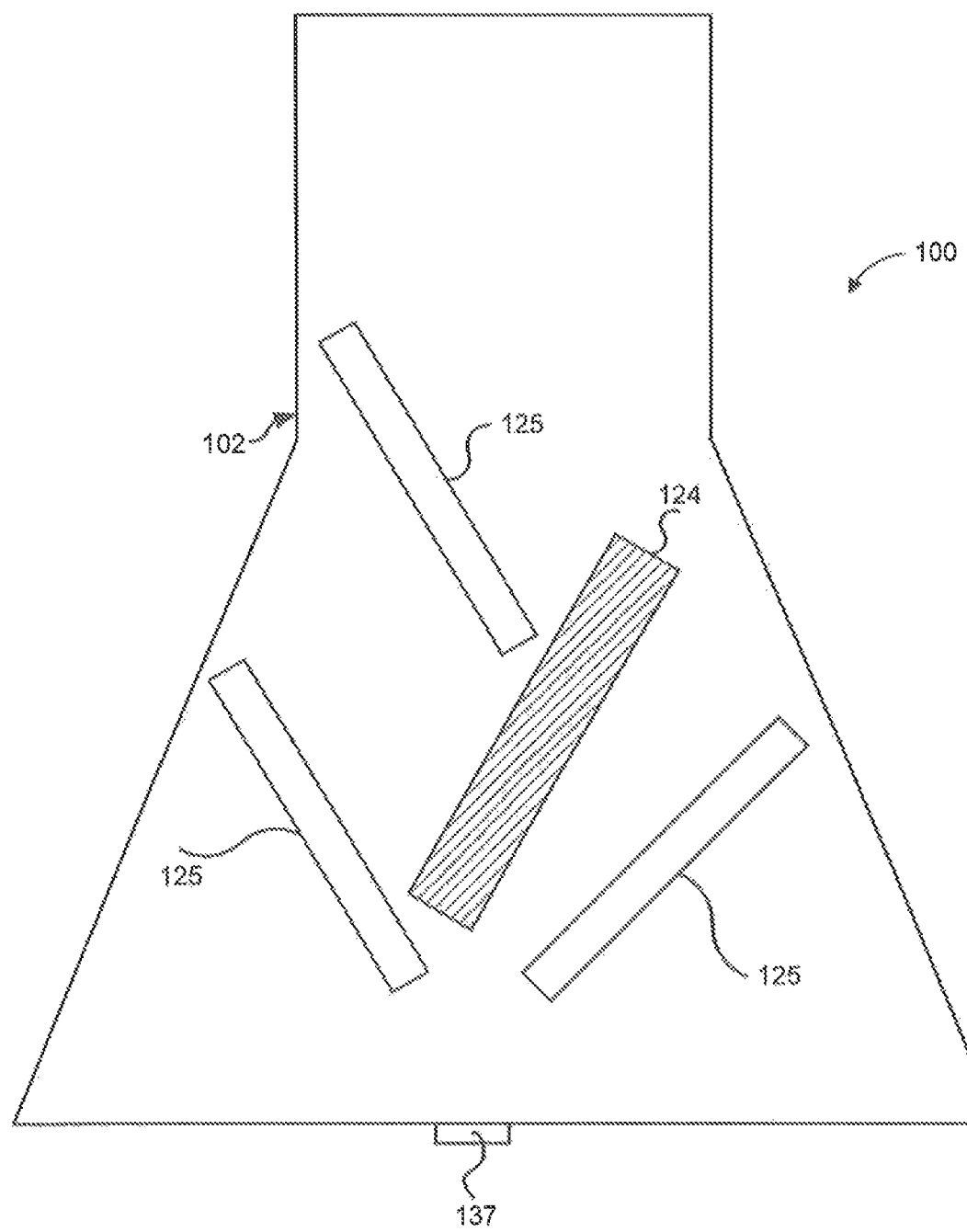
FIG. 2A is a top cross-section view of the fertilization application system of FIG. 1 taken along the line A-A in FIG. 1.
Figure 2B:
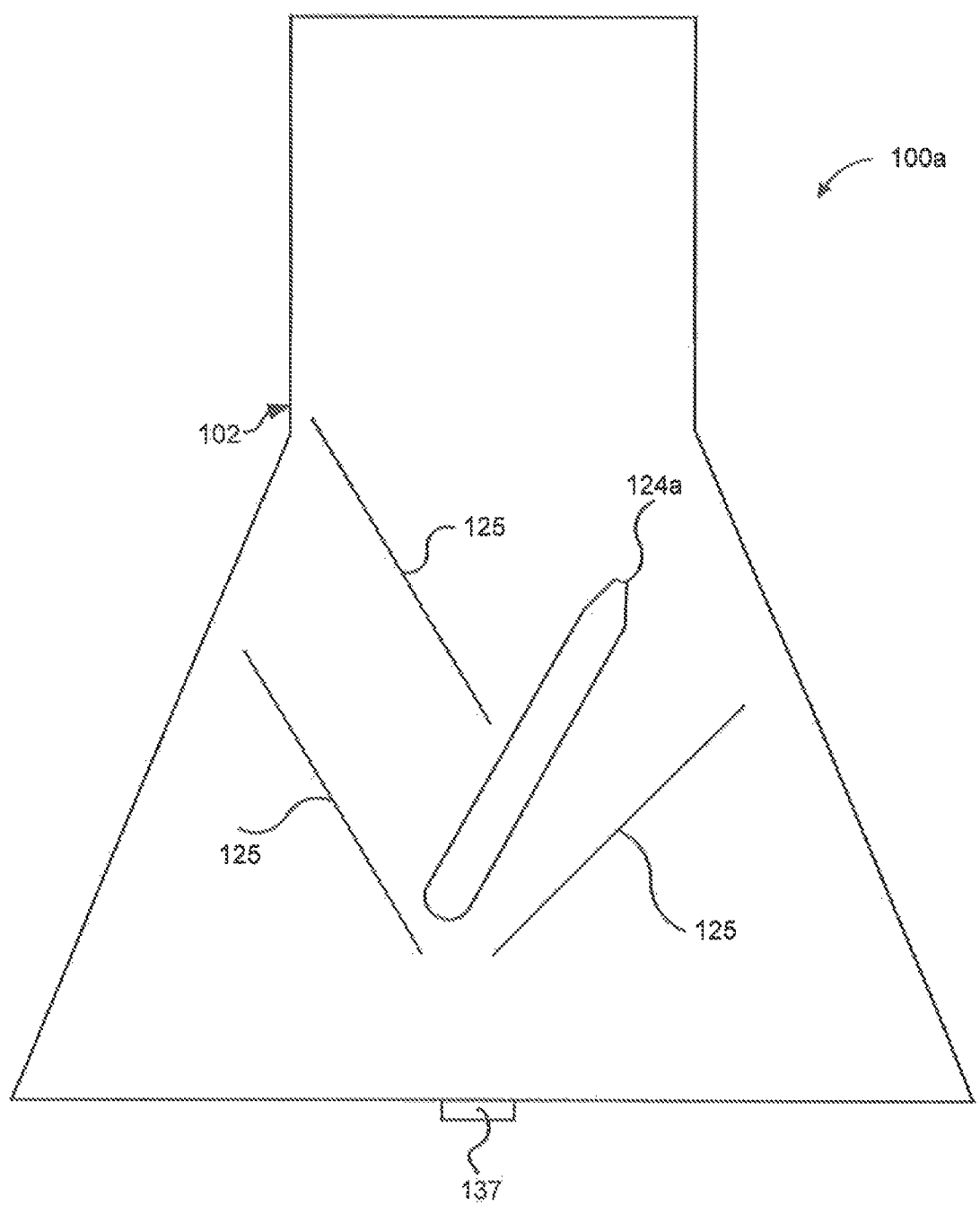
FIG. 2B is top cross-section view of a fertilizer application system, according to another embodiment.
Figure 2C:
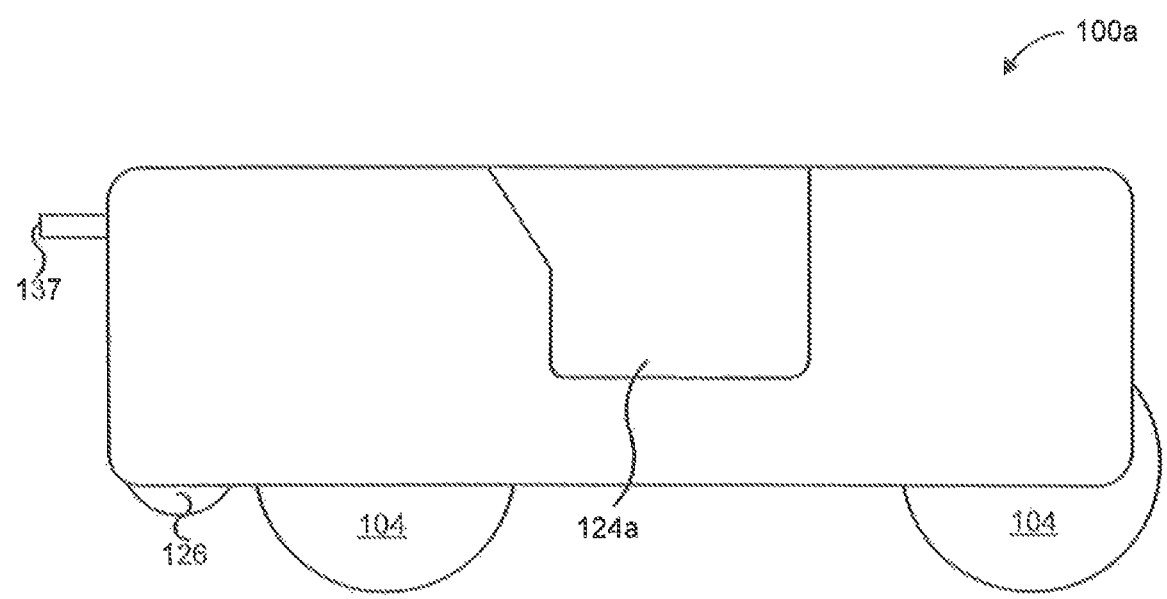
FIG. 2C is a side view of the fertilizer application system of FIG. 2B.
Figure 2D:
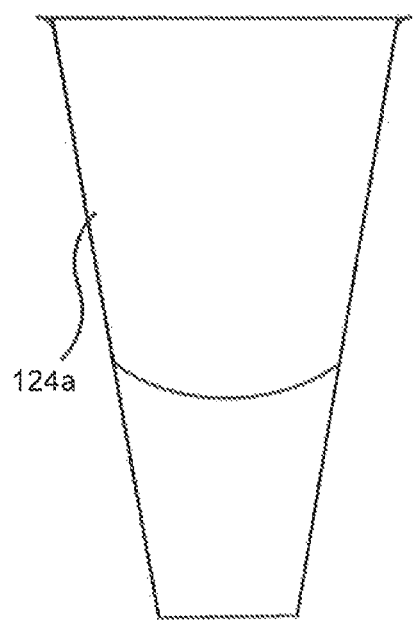
FIG. 2D is a front view of a top baffle included in the fertilizer application system of FIG. 2B-2C.

In some embodiments, the fertilizer application system 100 may include one top baffle 124 and three bottom baffles 125 as shown in FIGS. 2A and 2B. The top baffle 124 and/or the bottom baffle 125 may be a prism, a rectangular prism, trapezoidal prism, triangular prism, any other suitable shape, or any combination thereof. In some embodiments, the top baffle 124 or the bottom baffle 125 may be rectangular in shape (FIG. 2A). In some embodiments, the top baffle 124 or the bottom baffle 125 may define an angled shape having a rounded end (FIG. 2B, 2C). In some embodiments, the top baffle 124 or the bottom baffle 125 may have a tapered shape with a one side larger in width than another side. (FIG. 2D). In some embodiments, the baffles 124, 125 may be different sizes or all the same size.

The container 102 may also include a sump 126 coupled to the bottom of the container 102 with respect to gravity, and configured to collect undesirable liquids. In some embodiments, the inlet tube 120, the check valve 144, and the inlet tube filter 146 is positioned directly over the sump 126. In some embodiments, the inlet tube filter 146 is positioned inside the sump 126. The container 102 may also have a cap 138 disposed on a wall in the container 102. The cap 138 may be removed in order for the first fluid 101 to be inserted into the container 102.

A mixing handle system 128 may be disposed on the container 102 and configured to slosh or provide turbulence to the first fluid 101 within the container 102 when engaged by the user. In some embodiments, the mixing handle system 128 is configured to be engaged by the user to move the entirety of the container 102 in order to slosh or provide turbulence to the first fluid 101.

In some embodiments, the mixing handle system 128 may include a mixing handle first portion 127 positioned outside of the container 102 and configured to be engaged by the user. The mixing handle system 128 further includes a mixing handle second portion 129 disposed inside the internal volume defined by the container 102, and configured to displace and slosh the first fluid 101 in response to the mixing handle first portion 127 being displaced by the user. Both the first and second portions 127 and 129 of the mixing handle system 128 may include, for example, a paddle, flipper, etc. or any combination thereof rotated around a pivot, hinge, or etc.

Figure 2E:
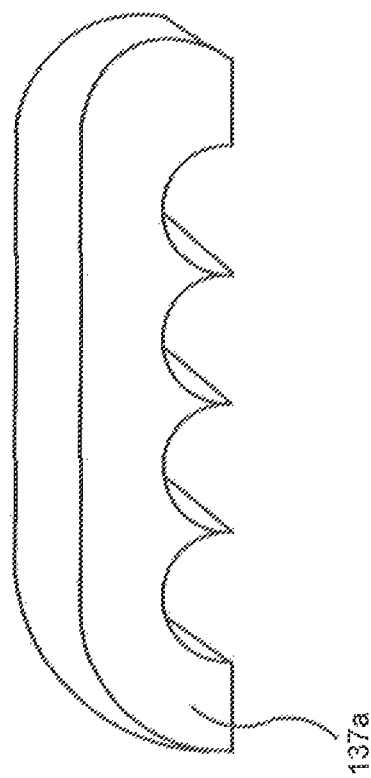
FIG. 2E shows a side perspective view of a grip handle that may be included in a fertilizer application system, according to an embodiment.

As described herein, the container 102 is formed by a plurality of walls, including the upper wall or roof 130, a bottom wall or floor 132 and a plurality of sidewalls including a first sidewall 134, and a second sidewall 136 disposed opposite the first sidewall 134. In some embodiments, the first sidewall 134 may be narrower than the second sidewall 136. In some embodiments, the siphon 114 and hose reel 106 are disposed on the upper wall 130. The mixing handle system 128 may be disposed on the second sidewall 136. In some embodiments, a grip handle 137 is disposed on the first sidewall 134 and configured to be engaged by the user to push or pull the container 102. In some embodiments, the grip handle 137 has finger grips (FIG. 2E). In some embodiments, the mixing handle system 127 may include a non-movable handle coupled to the second sidewall 136 of the container opposite the first sidewall 134. In such embodiments, a user may engage one or both of the grip handle 137 and the non-movable handle to shake the container 102 so as to slosh the first fluid 101 disposed within the container 102 and facilitate mixing.

Figure 5:
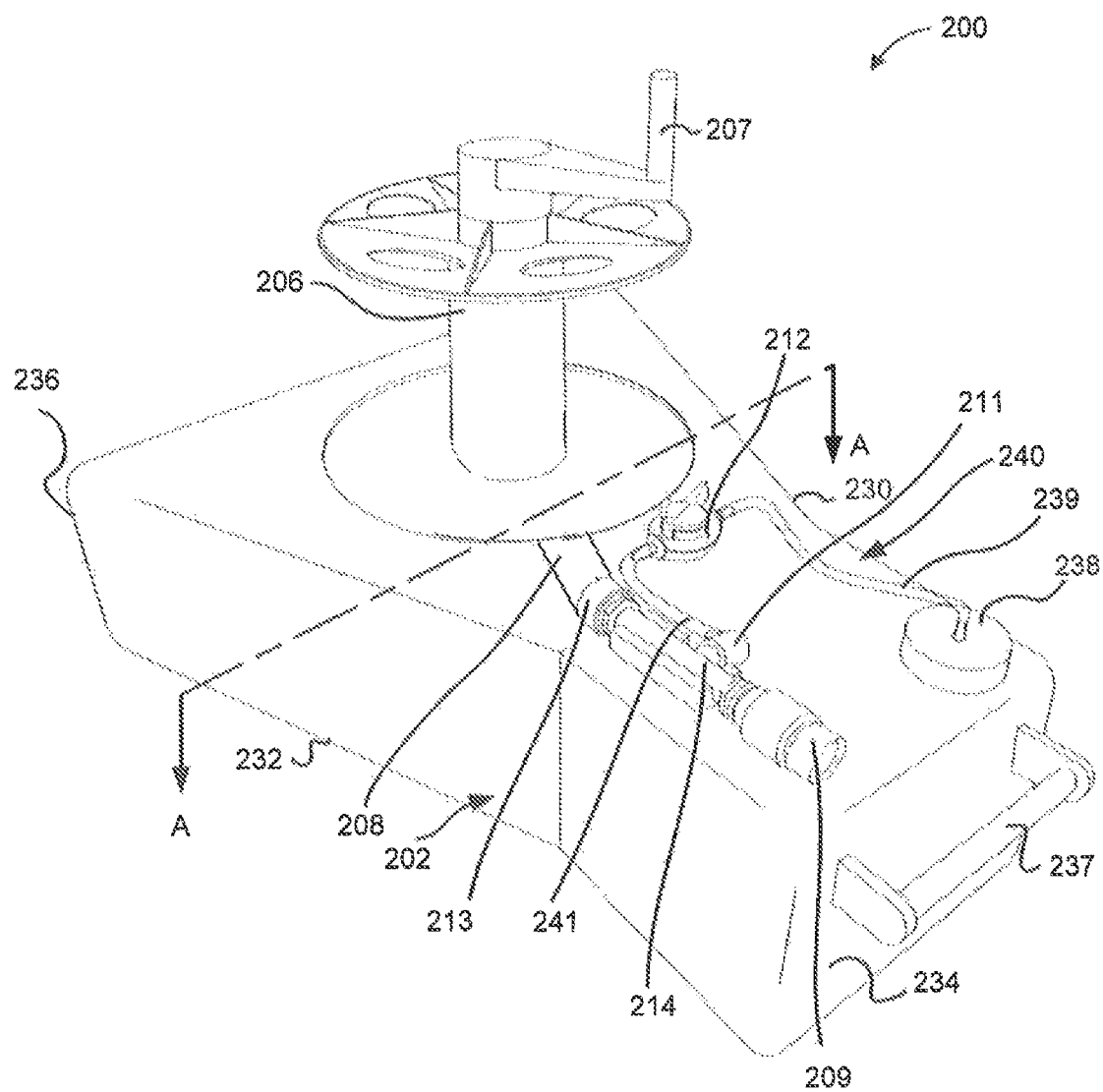
FIG. 5 is a top side perspective view of a fertilizer application system, according to another embodiment.

FIG. 3 further shows the siphon 114 fluidly coupled to the flow control valve 112. As previously described herein, the siphon 114 includes a first inlet 111, a second inlet 109, and an outlet 113. The siphon tube 140 (FIG. 3) fluidly couples the flow control valve 112 to the cap 138 and the siphon 114. The siphon tube first portion 139 (FIG. 3) is in fluid communication with the first fluid 101 through the cap 138 via the inlet tube 120. The siphon tube second portion 141 (FIG. 3) is fluidly coupled to the first inlet 111 of the siphon 114 and connects the flow control valve 112 to the siphon 114. The flow control valve 112 is fluidly coupled to a downstream end of the siphon tube first portion 139 and an upstream end of the siphon tube second portion 141. A first hose 108 may be coupled to the outlet 113 and configured to communicate the mixed fluid to the hose reel 106. A second hose 116 may be coupled to the second inlet 109 and configured provide the second fluid to the siphon 114 where the second fluid mixes with the first fluid 101 to form the mixed fluid. As the second fluid flows through the siphon 114 from the second inlet 109 to the outlet 113, negative pressure is generated at the first inlet 111 that draws the first fluid 101 into the siphon 114 via the first inlet 111. FIGS. 5 and 6 illustrate a fertilizer application system 200, according to another embodiment. The fertilizer application system 200 may include a container 202 with a plurality of walls including an upper wall or roof 230, a bottom wall of floor 232, a narrower first sidewall 234, and a wider second sidewall 236 disposed opposite the first sidewall 234. The container 202 is substantially similar to the container, as previously described herein. The container 202 may include a fluid level line defined on a sidewall of the container 202 substantially similar to the fluid level line 122 of the previous embodiment.

In some embodiments, the container 202 may include a hose reel 206 disposed on the container 202. The hose reel 206 includes a hose reel handle 207 and an output hose substantially similar to the hose reel handle 107 and the output hose 109. In some embodiments, there is also a first hose coupled to the hose reel 206 similar to the first hose 108. In some embodiments, the hose reel 206 may include a connector similar to the connector 150 as described with respect to FIG. 1.

In some embodiments, the container 202 includes a rolling mechanism 204 coupled thereto and configured to allow the container 202 to be rolled or wheeled on ground. Any rolling mechanisms may be used such as, for example, wheels, balls, tubes, bottle caps, etc. as shown in FIG. 4. The rolling mechanism 204 is substantially similar to the rolling mechanism 104. In some embodiments, the rolling mechanism 204 is positioned within a rolling mechanism cavity such as, but not limited, to a wheel well. In some embodiments, a mixing handle system is disposed on the second sidewall 236 of the container 202. The mixing handle system is substantially similar to the mixing handle system 128, as previously described herein.

In some embodiments, a siphon tube 240 and the hose reel 206 may be disposed on the upper wall 230 of the container 202. In some embodiments, there may be a hose reel plate similar to the hose reel plate 148 that couples the hose reel 206 to the container 202. The siphon tube 240 includes a siphon tube first portion 239 and a siphon tube second portion 241. The siphon tube first portion 239 is substantially similar to the siphon tube first portion 139, as previously described herein, and fluidly couples the flow control valve 212 to a first fluid disposed within the container 202 through the cap 238 via an inlet tube 220. The inlet tube 220 is substantially similar to the inlet tube 120. In some embodiments, the inlet tube 220 may be fluidly coupled to a check valve and an inlet tube filter substantially similar to those previously described herein. Likewise, the siphon tube second portion 241 is substantially similar to the siphon tube second portion 141, as previously described herein, and fluidly couples the flow control valve 212 to a first inlet 211 of a siphon 214.

The siphon 214 includes an outlet 213 configured to expel fluid. As a second fluid flows through the siphon 214 from a second inlet 209 to the outlet 213, negative pressure is generated at the first inlet 211 that draws the first fluid into the siphon 214 via the first inlet 211. The first hose is coupled to the outlet 213 of the siphon 214. The first hose is configured to expel fluid towards the hose reel 206. In some embodiments, the fertilizer application system 200 includes a second hose configured to provide the second fluid that is coupled to the second inlet 209 of the siphon 214. The fertilizer application system 200 further includes a flow control valve 212 that is substantially similar to the flow control valve 112, and is configured based on the surrounding ambient environment selected by a user.

The fertilizer application system 200 also may include at least one top baffle and at least one bottom baffle that are substantially similar to the top baffle 124 and the bottom baffle 125 of the fertilizer application system 100. In some embodiments, the fertilizer application system 200 includes one top baffle and three bottom baffles in order to provide turbulence to the fluid inside of the container. In some embodiments, the top baffle may be hollow. In some embodiments, the container 202 further includes a sump to collect fluid substantially similar to the sump 126, previously described herein. In some embodiments, a grip handle 237 is disposed on the first sidewall 234 on the container 202 and is substantially similar to the grip handle 137.

In some embodiments, the first fluid disposed in the internal volume of the container 102, 202 may be a liquid fertilizer concentrate. The liquid fertilizer concentrate may be a suspension, solution, colloid, etc. The liquid fertilizer concentrate is comprised of a nitrogen containing source such as but not limited to 45 wt % hot, 45 wt % dry urea, or NH3 (anhydrous ammonia). The liquid fertilizer concentrate is further comprised of a phosphorous containing source such as, but not limited to, 10-34-0 (ammonium polyphosphate), 11-37-0 (ammonium polyphosphate), 18-46-0 (di ammonium phosphate), 10-50-0 (monoammonium phosphate), or 52-54 wt % phosphoric acid. The liquid fertilizer concentrate is further comprised of a sulfur containing source such as, but limited to, 12-0-0-26 (ammonium thiosulfate), 21-0-0-26 (ammonium sulfate), ammonium nitrate, or elemental sulfur. The liquid fertilizer is further comprised of a potassium containing source such as, but not limited to, 62 wt % potash or 60 wt % potash. The liquid fertilizer is further comprised of an iron containing source such as, but not limited to, suspending clay. The liquid fertilizer may further include water. The nitrogen containing source, the phosphorous containing source, the sulfur containing source, the potassium containing source, and the iron containing source may all either be a liquid or a solid.

In some embodiments, the liquid fertilizer concentrate includes a nitrogen containing source, a phosphorous containing source, a sulfur containing source, a potassium containing source, an iron containing source and water. The liquid fertilizer concentrate has a nitrogen concentration in a range of about 18 wt % to about 42 wt %, inclusive. This nitrogen concentration would satisfy an industry standard amount for fertilizers of nitrogen per 1000 square feet of lawn. The liquid fertilizer concentrate may have a concentration of phosphorus in a range of about 3 wt % to about 7 wt %, inclusive; a concentration of potassium in a range of about 5 wt % to about 22 wt %, inclusive; a concentration of iron in a range of about 1 wt % to about 4 wt %, inclusive; and a concentration of sulfur in a range of about 1 wt % to about 3 wt %, inclusive.

For example, the liquid fertilizer concentrate may include about 48 wt % of the 45 wt % urea, about 14.7 wt % of the 10-34-0, about 8.0 wt % of the 12-0-0-26, about 1.5 wt % of the suspending clay, about 16.0 wt % of the 62 wt % potash, and about 12 wt % of the water in order to yield these elemental compositions. In such embodiments, the phosphorous containing source is liquid; the sulfur containing source is liquid; the iron containing source is solid; the nitrogen containing source may be either liquid or solid; and the potassium containing source is solid. In other embodiments, each source could be either liquid or solid.

In some embodiments, the liquid fertilizer concentrate includes a green coloring in order to mimic the coloring of lawns to appeal to more customers. The green coloring can be any shade of green in order to represent different shades of grass such as forest, sage, olive, hunter green, etc., or any combination thereof. In other embodiments, liquid fertilizer concentrate may include a spray pattern identifier, for example, a dark color such as blue or orange so as to enable identification of areas where the liquid fertilizer has already been applied. In some embodiments, a fragrance, such as lilac, is added to the liquid fertilizer concentrate in order to make the product more appealing to customers.

In some embodiments, the total amount of one application of the liquid fertilizer concentrate may be one gallon. The liquid fertilizer concentrate may be inserted into the fertilizer application system and used as the first fluid 101. In some embodiments, the same amount, such as one gallon, of water is inserted into the liquid fertilizer concentrate storage container and poured into the container of the fertilizer application system along with any small remaining amounts of the liquid fertilizer concentrate.

In some embodiments, any amount of fluid for example water may be used to dilute the liquid fertilizer concentrate from about 10 vol %, 20 vol %, 30 vol %, 40 vol %, 50 vol %, 60 vol %, 70 vol %, 80 vol %, or 90 vol %, inclusive. The liquid fertilizer concentrate may be diluted by about 50 vol %. Diluting the fertilizer concentrate may reduce burning of the lawn and may also clean any excess liquid fertilizer concentrate left in the storage container. For example, the concentration of nitrogen in the liquid fertilizer concentrate after dilution by about 50 vol % may be in a range of about 11 wt % to about 13 wt %, inclusive. In some embodiments, at least one additive such as weed killer, insecticides, pesticides, sulfur nutrients, nitrogen nutrients, trace metals, iron sulfate, copper sulfate, etc. may be added to the liquid fertilizer concentrate. In some embodiments, the additive may include a plant wax breaker configured to break the inherent wax layer that may be present on grass or plants so as to enhance absorption of the fertilizer. In some embodiments, the additive may include a drift control additive configured to control a droplet size of the liquid fertilizer so as to reduce spreading of the liquid fertilizer spray during application.

FIG. 7 is a schematic flow diagram of an example method 300 for formulating a liquid fertilizer concentrate. The method 300 includes adding water to a vessel (e.g., a vat), at 302. A liquid phosphorous containing source is added to the vessel, at 304. For example, the liquid phosphorous containing source may include 10-34-0 but is not limited to (ammonium polyphosphate), 11-37-0 (ammonium polyphosphate), 18-46-0 (diammonium phosphate), 10-50-0 (monoammonium phosphate), or 52-54 wt % phosphoric acid. In some embodiments, the phosphorous containing source is a solid.

A liquid sulfur containing source is added to the vessel, at 306 so as to form a solution. For example, the liquid sulfur containing source may include 12-0-0-26 (ammonium thiosulfate), 21-0-0-26 (ammonium sulfate), or elemental sulfur. In some embodiments, the sulfur containing source may be a solid. In some embodiments, the various the contents of the vessel is mixed as each component is added thereto, for example, via stirring or using a pump. The pump may shear the solution and achieve total suspension of the solution, or complete dissolution of the particles in the solution such that the solution is completely liquid before packaging and shipping.

At 308, an iron containing source is added to the solution. In some embodiments, the iron containing source includes suspending clay that is added to the solution to provided gelation. A nitrogen containing source, for example, liquid 45 wt % urea or dry 45 wt % urea, is added to the solution, at 310, such that liquid fertilizer concentrate may include nitrogen in a range of about 18 wt % to about 42 wt %, inclusive once completely formed.

In some embodiments, the liquid urea (e.g., liquid 45 wt % urea) includes hot urea liquor provided in a liquid state with a temperature in the range of about 160 degrees Celsius to about 200 degrees Celsius, inclusive. No supplemental heat is used in implementations where hot liquor is used.

In other embodiments, dry urea (e.g. dry 45 wt % urea) is added to the solution and the vessel is heated to a temperature sufficient to melt the urea (e.g., equal to or greater than about 133 degrees Celsius). For example, an oil-fired boiler may be used to supply the heat to melt the urea.

In some embodiments, NH3 (anhydrous ammonia) may be used as the nitrogen containing source.

A potassium containing source, for example, 62 wt % potash or 60 wt % potash, is added to the solution, at 312 and mixed. The potassium containing source may be either a liquid or a solid. The solution, i.e., the liquid fertilizer concentrate is packaged in storage containers, for example, one gallon jugs, at 314. In some embodiments, the liquid fertilizer concentrate may be further diluted with a second fluid, for example, water to reduce the concentration of each of the phosphorous containing source, the sulfur containing source, the iron containing source, the nitrogen containing source, and the potassium containing source in the solution and therefore dilute the liquid fertilizer concentrate. Any amount of fluid may be used to dilute the liquid fertilizer concentrate such that ratio of the fluid to the liquid fertilizer concentrate is in a range of about 10 vol %, 20 vol %, 30 vol %, 40 vol %, 50 vol %, 60 vol %, 70 vol %, 80 vol %, or 90 vol %, inclusive. In some embodiments, the liquid fertilizer concentrate is diluted with water such that the ratio of the fluid to the liquid fertilizer concentrate is in a range of about 50 vol %, inclusive. In some embodiments, at least one trace amount of additives such as, for example, weed killer, insecticides, pesticides, sulfur nutrients, nitrogen nutrients, trace metals, iron sulfate, copper sulfate, etc. is added to the liquid fertilizer concentrate.

In some embodiments, a fertilizer application system includes a container defining an internal volume configured to hold a first fluid; a siphon disposed on the container, and a flow control valve. The siphon includes a first inlet structured to receive the first fluid, a second inlet structured to receive a second fluid different from the first fluid, and an outlet configured to output a mixed fluid comprising a mixture of the first fluid and the second fluid. The siphon includes a siphon tube first portion in fluid communication with the first fluid, and a siphon tube second portion fluidly coupled to the first inlet of the siphon. The flow control valve is disposed on the container. The flow control valve is fluidly coupled to a downstream end of the siphon tube first portion and an upstream end of the siphon tube second portion. The flow control valve is configured to selectively control an amount of the first fluid flowing through the flow control valve to the siphon through the siphon tube second portion based on an ambient temperature of an environment outside the container.

In some embodiments, the siphon of the fertilizer application system is configured to generate a negative pressure at the first inlet. As the second fluid flows through the siphon from the second inlet to the outlet, the negative pressure is configured to draw the first fluid into the siphon via the first inlet.

In some embodiments, the first fluid includes a liquid fertilizer concentrate. In some embodiments, the fertilizer application system may include a mixing handle disposed on the container.

In some embodiments, the mixing handle includes a mixing handle first portion positioned outside the container and a mixing handle second portion disposed in the container. The mixing handle first portion is configured to be engaged by a user. The mixing handle second portion is configured to displace and slosh the fluid in response to the mixing handle first portion being displaced by the user.

In some embodiments, the fertilizer application system may include a fluid level line defined on a sidewall of the container. The fluid level line is configured to indicate a maximum allowable level of the first fluid in the internal volume of the container.

In some embodiments, the fertilizer application system may include a filter configured to filter the first fluid, the second fluid, or the mixed fluid.

In some embodiments, the fertilizer application system may have a hose reel disposed on the container. The hose reel may include a cylindrical rotating column and a handle coupled to the cylindrical rotating column.

In some embodiments, the fertilizer application system may also include at least one baffle disposed within the internal volume of the container.

In some embodiments, the fertilizer application system may include a rolling mechanism coupled to the container and configured to enable rolling of the container on a surface.

In some embodiments, a liquid fertilizer concentrate includes a nitrogen containing source, a phosphorous containing source, a sulfur containing source, a potassium containing source, an iron containing source and water. The liquid fertilizer concentrate has a nitrogen concentration in a range of about 18 wt % to about 42 wt %, inclusive. The liquid fertilizer concentrate may have a concentration of phosphorus in a range of about 3 wt % to about 7 wt %, inclusive; a concentration of potassium in a range of about 5 wt % to about 22 wt %, inclusive; a concentration of iron in a range of about 1 wt % to about 4 wt %, inclusive; and a concentration of sulfur in a range of about 1 wt % to about 3 wt %, inclusive.

In some embodiments, the liquid fertilizer concentrate has a green coloring.

In some embodiments, a method for formulating a liquid fertilizer concentrate includes inserting a phosphorous containing source into a vessel, adding a sulfur containing source to the vessel, adding an iron containing source to the vessel, adding a nitrogen containing source to the vessel, adding a potassium containing source to the vessel, adding water to the vessel to form a mixture, and mixing the mixture to form the liquid fertilizer concentration. The concentration of nitrogen in the liquid fertilizer concentrate is in a range of about 18 wt % to about 42 wt %, inclusive.

In some embodiments, the nitrogen containing source includes liquid urea.

In some embodiments, the nitrogen containing source includes dry urea, and the method further includes heating the vessel to a temperature sufficient to melt the dry urea.

In some embodiments, the method includes diluting the liquid fertilizer concentrate with a fluid such as water to reduce the concentration of each of the phosphorous containing source, the sulfur containing source, the iron containing source, the nitrogen containing source, and the potassium containing source.

As used herein, the singular forms "a", "an" and "the" include plural referents unless the context clearly dictates otherwise. Thus, for example, the term "a member" is intended to mean a single member of a combination of members, "a material" is intended to mean one or more materials, or a combination thereof.

As used herein, the terms "about" generally mean plus or minus 10% of the stated value. For example, about 0.5 would include 0.45 and 0.55, about 10 would include 9 and 11, about 1000 would include 900 to 1100.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a singular unitary body with one another or with the two members or the two members and any additional intermediate members being attached to one another.

The terms "fluidly coupled" and the like used herein mean the joining of two members directly or indirectly to one another through the flow of a fluid. Such joining may be achieved with two members may be directly coupled to one another or indirectly coupled with the fluid as the connecting member.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

In the above description, certain terms may be used such as "up," "down," "upper," "lower," "top," "bottom," "upper," "lower," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cased be excised from the combination, and the claimed combination may be directed to a subcombination or variation of a subcombination.

What is claimed is:

1. A fertilizer application system, comprising:
    a container having an upper wall and a bottom wall and defining an internal volume configured to hold a first fluid;
    at least one top baffle coupled to the upper wall of the container;
    at least one bottom baffle coupled to the bottom wall of the container;
    a siphon disposed on the container, the siphon comprising a first inlet structured to receive the first fluid, a second inlet structured to receive a second fluid different from the first fluid, and an outlet configured to output a mixed fluid comprising a mixture of the first fluid and the second fluid;
    a siphon tube comprising:
        a siphon tube first portion in fluid communication with the first fluid, and
        a siphon tube second portion fluidly coupled to the first inlet of the siphon; and
    a flow control valve disposed on the container, the flow control valve fluidly coupled to a downstream end of the siphon tube first portion and an upstream end of the siphon tube second portion, the flow control valve configured to selectively control an amount of the first fluid flowing through the flow control valve to the siphon through the siphon tube second portion based on an ambient temperature of an environment outside the container.

2. The fertilizer application system of claim 1, wherein the siphon is configured to generate a negative pressure at the first inlet as the second fluid flows through the siphon from the second inlet to the outlet, the negative pressure configured to draw the first fluid into the siphon via the first inlet.

3. The fertilizer application system of claim 1, wherein the first fluid comprises a liquid fertilizer concentrate.

4. The fertilizer application system of claim 1, further comprising a fluid level line defined on a sidewall of the container, the fluid level line configured to indicate a maximum allowable level of the first fluid in the internal volume of the container.

5. The fertilizer application system of claim 1, further comprising a filter configured to filter the first fluid, the second fluid or the mixed fluid.

6. The fertilizer application system of claim 1, further comprising a hose reel disposed on the container, the hose reel comprising a cylindrical rotating column and a handle coupled to the cylindrical rotating column.

7. The fertilizer application system of claim 1, further comprising a rolling mechanism coupled to the container and configured to enable rolling of the container on a surface.

8. A fertilizer application system comprising:
    a container defining an internal volume configured to hold a first fluid;
    a siphon disposed on the container, the siphon comprising a first inlet structured to receive the first fluid, a second inlet structured to receive a second fluid different from the first fluid, and an outlet configured to output a mixed fluid comprising a mixture of the first fluid and the second fluid;
    a siphon tube comprising:
        a siphon tube first portion in fluid communication with the first fluid, and
        a siphon tube second portion fluidly coupled to the first inlet of the siphon;
    a flow control valve disposed on the container, the flow control valve fluidly coupled to a downstream end of the siphon tube first portion and an upstream end of the siphon tube second portion, the flow control valve configured to selectively control an amount of the first fluid flowing through the flow control valve to the siphon through the siphon tube second portion based on an ambient temperature of an environment outside the container; and
    a mixing handle disposed on the container, the mixing handle comprising:
        a mixing handle first portion positioned outside the container and configured to be engaged by a user; and
        a mixing handle second portion disposed in the container, the mixing handle second portion configured to mix the fluid in response to the mixing handle first portion being displaced by the user.

9. The fertilizer application system of claim 8, further comprising a fluid level line defined on a sidewall of the container, the fluid level line configured to indicate a maximum allowable level of the first fluid in the internal volume of the container.

10. The fertilizer application system of claim 8, further comprising a filter configured to filter the first fluid, the second fluid or the mixed fluid.

11. The fertilizer application system of claim 8, further comprising a hose reel disposed on the container, the hose reel comprising a cylindrical rotating column and a handle coupled to the cylindrical rotating column.

12. The fertilizer application system of claim 8, further comprising a rolling mechanism coupled to the container and configured to enable rolling of the container on a surface.

* * * * *